April 5, 1938.  N. F. MILLER  2,113,057
DOOR FLY SWATTER
Filed Jan. 27, 1937  2 Sheets-Sheet 1

Inventor
Nickolaus F. Miller
By C. A. Snow & Co.
Attorneys.

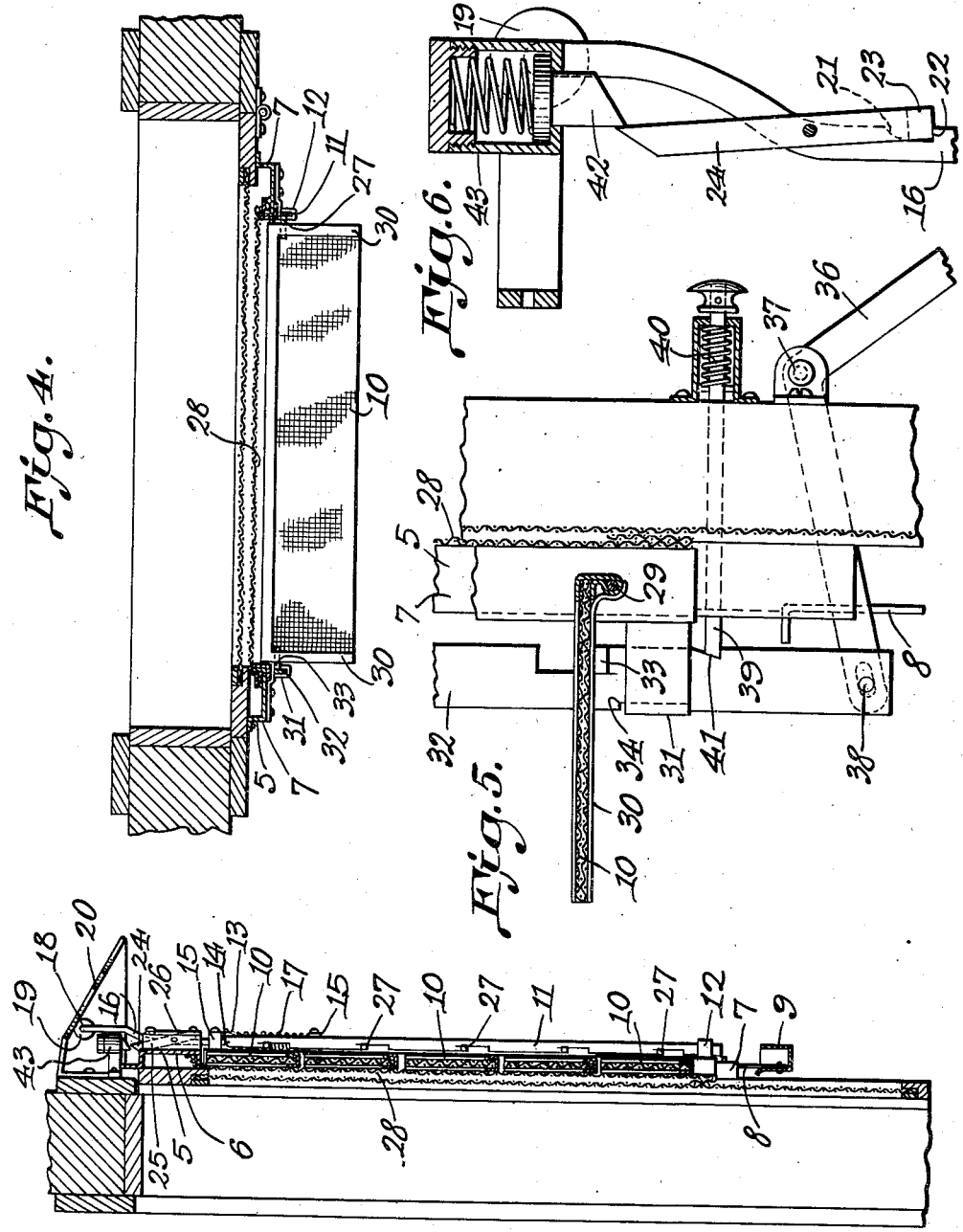

Patented Apr. 5, 1938

2,113,057

UNITED STATES PATENT OFFICE 2,113,057

DOOR FLY SWATTER

Nickolaus F. Miller, Dwight, Ill.

Application January 27, 1937, Serial No. 122,669

4 Claims. (Cl. 43—110)

This invention relates to a mechanical fly and insect killing device designed primarily for mounting on a screen door, and operated automatically when the screen door is opened or closed.

Another object of the invention is to provide a device of this character which may be manually operated independently of the movements of the screen door.

A further object of the invention is to provide a fly or insect killing device of this character including a plurality of horizontal pivoted blades, adapted to move into contact with the wire mesh material forming a part of the device, thereby killing insects on the wire mesh material.

A still further object of the invention is to provide means for catching the insects or flies, after they have been killed and fall from the screen.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 3 is a longitudinal sectional view through the device showing the blades as contacting with the wire mesh material, forming a part of the device, the blades having been operated to accomplish the purpose of the invention.

Figure 4 is a sectional view taken on line 4—4 of Figure 1.

Figure 5 is a fragmental enlarged detail view, disclosing means for manually operating the blades.

Figure 6 is a detail view illustrating the pivoted latch operating means, for automatically operating the blades, with the movements of the door.

Figure 2:
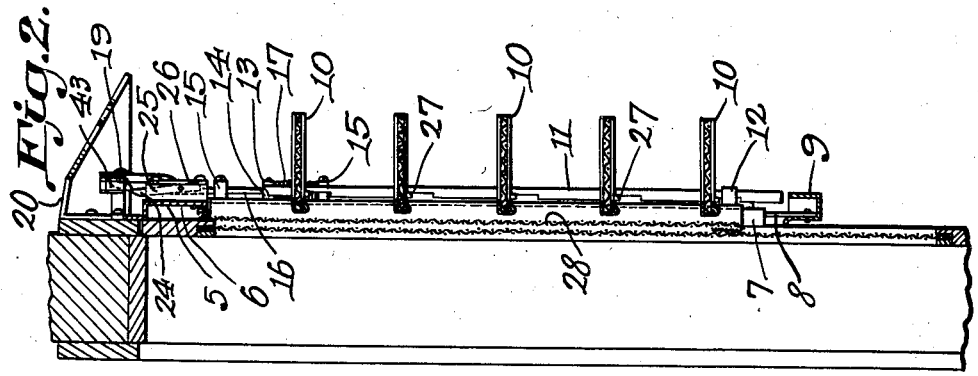
Figure 2 is a vertical sectional view through the device, showing the blades in their set positions.
Figure 1:
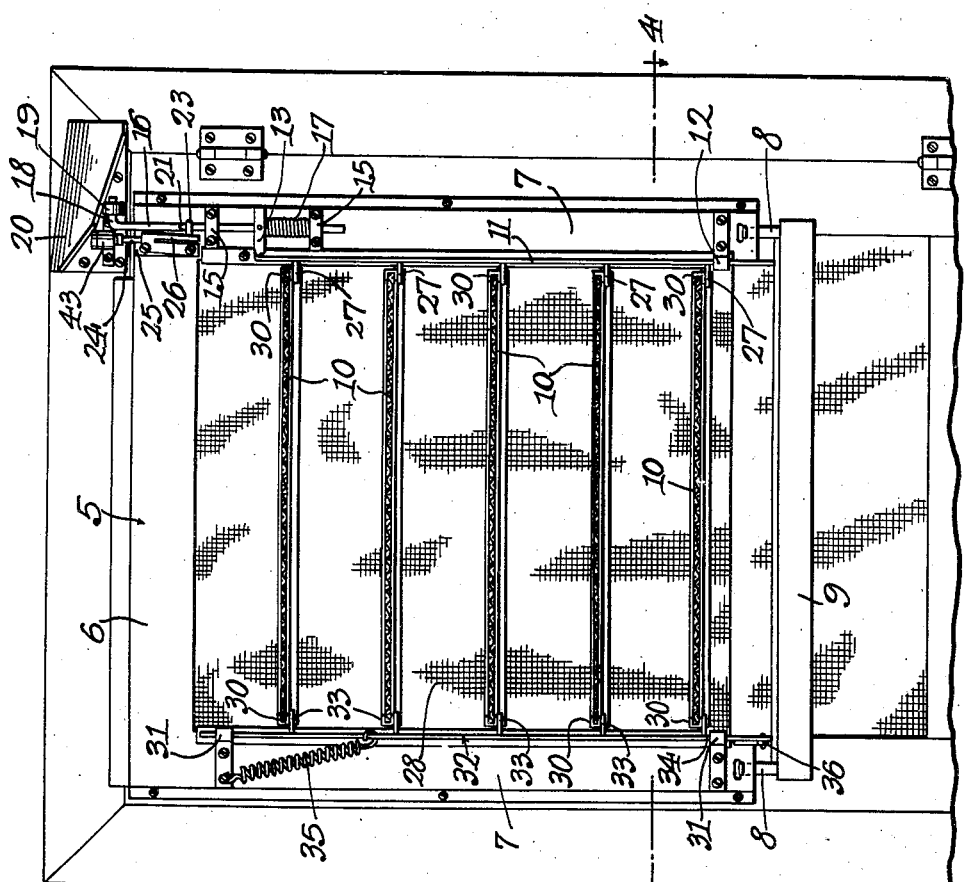
Figure 1 is an elevational view disclosing a fly or insect killing device, constructed in accordance with the invention, as mounted on a screen door.

Referring to the drawings in detail, the device embodies a rectangular frame indicated generally by the reference character 5, the frame comprising an upper bar 6, and side bars 7, the lower ends of the side bars 7 being formed with openings to receive the heads formed at the upper ends of the arms 8, which are secured to the trough 9. This trough 9 has its open side disposed directly under the frame, so that flies or insects killed by the device, may fall into the trough and be removed.

Pivotally mounted within openings formed in the side bars 7 of the frame 5, are blades 10, the blades being of widths, so that when the blades are moved to cause the side faces thereof to be parallel with respect to each other, substantially the entire surface of the screen door, to which the device is attached, will be covered. It will of course be understood that the blades are pivotally mounted so that they will move freely, under the action of the operating device, to be hereinafter more fully described.

The reference character 11 designates one of the actuating bars, and as shown this bar has its lower end mounted in the guide 12 secured at the lower end of the side bar 7, at one side of the frame, the upper end of the actuating bar 11 being extended laterally as at 13, where it is secured to the guide block 14 that moves over one of the side bars 7 of the frame, as clearly shown by Figure 2 of the drawings.

Mounted on one of the side bars 7 of the frame, and disposed at opposite sides of the guide block 14, are guide members 15, which are formed with openings through which the operating rod 16 extends, the rod being secured to the guide block 14, so that movement of the operating rod 16, will result in a relative movement of the actuating bar 11. A coiled spring indicated by the reference character 17, is disposed between the lower guide member 15, and guide block 14, the action of the spring being to normally urge the guide block 14 and actuating bar 11, upwardly.

The upper end of the operating rod 16 is extended laterally as at 18, where it supports the roller 19, which contacts with the cam member 20 rigidly secured to the screen door.

It will of course be understood that this cam member 20 is of such construction that it extends an appreciable distance beyond the frame of the door, and lies in the path of travel of the roller 19 to cause the operating rod 16 to move downwardly, as the screen door swings to its open position.

A notch 21 is formed in the operating rod 16, and defines a shoulder 22, the shoulder being so arranged that the laterally extended finger 23 of the pivoted latch 24 will engage the shoulder, to hold the operating rod 16 in a set position, after it has moved downwardly.

This pivoted latch 24 is mounted on the block 25, which is secured to the upper bar 6 of the frame, the block being disposed in parallel relation with the operating rod 16, so that the latch will be supported in a vertical position, at all times.

A spring member indicated by the reference character 26 rests against the finger 23, and normally urges the finger into the notch 21 of the operating rod 16, with the result that as the operating rod moves downwardly and the finger 23 falls opposite to the notch, the finger will be forced into the notch, preventing upward movement of the operating rod, until released by the pivoted latch.

Extending inwardly from the actuating bar 11, are fingers 27, which are arranged in vertical spaced relation with each other, and so disposed that they provide rests for the pivoted blades 10, to the end that the pivoted blades 10 are supported with their side faces in horizontal positions. Secured to the frame 5, is a length of wire mesh material indicated by the reference character 28, against which the blades 10, engage when the blades are moved to their active positions. It might be further stated, that each of these blades includes a supporting rod 29 to which the bars 30 are secured, the bars 30 being disposed at the ends of the supporting rods 29. These bars 30 provide support for lengths of wire mesh material which constitute the body portions of the blades 10.

Secured to the side bars 7, at the opposite side of the frame 5, are guide members 31, in which the actuating bar 32 operates, the actuating bar 32 constituting the manually controlled operating means of the device.

This bar is also provided with laterally extended fingers 33 that provide supports for the blades 10, when the blades are in their open positions. A notch indicated by the reference character 34 is formed in the upper surface of the actuating bar 32, and is adapted to receive the lowermost guide member 31, to secure the actuating bar 32 in a set position, under normal conditions.

Coiled spring 35 has one of its ends connected to the actuating bar 32, the opposite end thereof being secured to the frame, so that when the actuating bar 32 has been moved to its lowermost position, this spring 35 will be placed under tension to urge the actuating bar 32 upwardly, when the notch and guide member have been disengaged. It will be seen that this movement will cause the blades to suddenly move upwardly, the side faces of the blades contacting with the wire mesh material 28, killing flies or insects on the wire mesh material.

This bar 32 is operated by means of the lever 36, which is pivotally supported on the frame 5, at 37, one end of the lever being provided with an elongated opening in which the pin 38 is positioned, the pin 38 being carried at the lower end of the actuating bar 32.

It will of course be understood that this lever 36, extends through the frame, so that it may be operated from a point within the frame or building, of which the screen door forms a part.

In order that the actuating bar 32 will be held in a set position, under normal conditions, and will be held against operation due to sudden jar or shock caused by the opening and closing of the door, the sliding bolt indicated by the reference character 39 is provided, the sliding bolt being actuated against the action of the coiled spring 40, when the sliding bolt is pulled inwardly.

The outer end of the sliding bolt 39 engages in a notch 41 formed in the inner edge of the actuating bar 32, as clearly shown by Figure 5 of the drawings.

When it is desired to operate the actuating bar 32 by the manually operating means, it will of course be understood that the sliding bolt is pulled inwardly, releasing the actuating bar, whereupon the lever 36 may be operated as described.

The reference character 42 designates a spring pressed lug, operating in the housing 43, disposed directly above the pivoted latch 24, the lug having an inclined end over which the upper end of the latch 24 moves, as the door and frame of the device move inwardly. As the door and frame move inwardly, the pivoted latch 24 will snap past the lug 42, and assume the position as shown by Figure 6. It follows that when the door and frame swing outwardly, the upper end of the pivoted latch 24 will be held against movement, with the result that the lower end of the pivoted latch will move outwardly, causing the finger 23 to move to disengage the operating rod 16, allowing the operating rod to move upwardly with the result that the blades are swung so that their side faces are parallel with the wire mesh material 28, killing the flies or insects, as before described.

Having thus described the invention, what is claimed is:

1. The combination with a swinging closure, of a device including a frame adapted to be secured to the closure, a length of wire mesh material secured to the frame, a plurality of pivoted blades mounted on the frame and adapted to swing into engagement with the wire mesh material killing insects on the wire mesh material, and means controlled by movements of the closure to its open or closed position, for actuating the blades.

2. The combination with a swinging closure, of a device including a frame adapted to be secured to the closure, a length of wire mesh material mounted on the frame, a plurality of pivoted blades mounted on the frame, an operating means including an actuating bar, slidably mounted on the frame, fingers extending laterally from the actuating bar and providing rests for the blades, when the blades are in their open positions, and means for operating the actuating bar for swinging the blades into engagement with the wire mesh material, killing insects on the length of wire mesh material.

3. The combination with a closure, of a device including a frame, a plurality of blades pivotally mounted on the frame, an actuating bar slidably mounted on the frame, supporting members on the actuating bar providing supports for the blades when the blades are in their open positions, and means for operating the actuating bar whereby the blades are snapped upwardly into engagement with the length of wire mesh material, killing insects on the wire mesh material.

4. The combination with a closure, of a device including a frame, secured to the closure, a plurality of blades constructed of wire mesh material, mounted on the frame, a length of wire mesh material mounted on the closure and against which the blades move, killing insects on the wire mesh material, means for normally supporting the blades in their open positions, and means controlled by the movements of the closure for moving the blades upwardly into engagement with the wire mesh material.

NICKOLAUS F. MILLER.